United States Patent
Shimizu

(10) Patent No.: US 11,059,355 B2
(45) Date of Patent: Jul. 13, 2021

(54) CONNECTOR FOR SUN VISOR

(71) Applicant: Yazaki Corporation, Tokyo (JP)

(72) Inventor: Tomohiko Shimizu, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 16 days.

(21) Appl. No.: 16/527,308

(22) Filed: Jul. 31, 2019

(65) Prior Publication Data
US 2020/0039331 A1 Feb. 6, 2020

(30) Foreign Application Priority Data

Aug. 2, 2018 (JP) .............................. JP2018-145712

(51) Int. Cl.
*B60J 3/00* (2006.01)
*B60J 3/02* (2006.01)

(52) U.S. Cl.
CPC ................... *B60J 3/0226* (2013.01)

(58) Field of Classification Search
CPC ......... B60J 3/213; B60J 3/0226; B60J 3/0217
USPC ............ 248/220.21, 220.22, 224.8; 296/97.9
See application file for complete search history.

(56) References Cited

U.S. PATENT DOCUMENTS

| | | | | | |
|---|---|---|---|---|---|
| 4,989,911 | A | * | 2/1991 | Van Order | ............. B60J 3/0217 248/27.3 |
| 5,061,005 | A | * | 10/1991 | Van Order | ............. B60J 3/0217 296/97.9 |
| 2002/0094719 | A1 | * | 7/2002 | Sawayanagi | ........... B60J 3/0221 439/545 |
| 2004/0032144 | A1 | * | 2/2004 | Arendsen | ............... B60J 3/0217 296/97.9 |
| 2011/0260491 | A1 | | 10/2011 | Ebisuoka | |
| 2018/0361834 | A1 | * | 12/2018 | Nishiyama | ............. B60J 3/0217 |
| 2018/0361835 | A1 | * | 12/2018 | Kawashima | ........... B60J 3/0221 |
| 2018/0361836 | A1 | * | 12/2018 | Nishiyama | ............. B60J 3/0217 |
| 2018/0370341 | A1 | * | 12/2018 | Shimizu | ................. B60J 3/0217 |
| 2019/0061485 | A1 | * | 2/2019 | Nishiyama | ............. B60Q 3/252 |

FOREIGN PATENT DOCUMENTS

JP 2011-230559 A 11/2011

* cited by examiner

*Primary Examiner* — Steven M Marsh
(74) *Attorney, Agent, or Firm* — Sughrue Mion, PLLC

(57) ABSTRACT

A connector for a sun visor includes a bracket attached to an attachment member, an arm portion which rotatably supports a sun-visor body arranged on one side of the attachment member and of which an end is rotatably inserted into the bracket, a housing fixed to the other side of the attachment member of the bracket and arranged near the end of the arm portion, a connector terminal accommodated in the housing and including a mating connection portion arranged on the other side of the attachment member and an arm-connection portion connected to the end of the arm portion, a fixing portion provided in the connector terminal, and fixing the connector terminal to the housing, and a pressing portion provided at a portion of the connector terminal which faces the bracket, abutting on the bracket, and pressing the connector terminal in an insertion direction of the fixing portion.

4 Claims, 12 Drawing Sheets

CONNECTOR FOR SUN VISOR

CROSS REFERENCE TO RELATED APPLICATION

This application is based upon and claims the benefit of priority from the prior Japanese Patent Application No. 2018-145712, filed on Aug. 2, 2018, the entire contents of which are incorporated herein by reference.

BACKGROUND

Technical Field

The disclosure relates to a connector for a sun visor. In detail, the disclosure relates to a connector for a sun visor which is applied to a sun visor rotatably attached to an attachment member.

Related Art

Conventionally, as a connector for a sun visor, there has been known a connector including a bracket which is attached to a ceiling of a vehicle interior as an attachment member, a support shaft as an arm portion which rotatably supports a sun visor body arranged on a vehicle interior side and of which an end is rotatably arranged and inserted into the bracket, a housing which is fixed to a vehicle exterior side of the bracket and is arranged in the vicinity of the end of the support shaft which is inserted into the bracket, and a connector terminal which is accommodated in the housing and includes a mating connection portion connected to a mating terminal arranged on the vehicle exterior side and an arm connection portion connected to an end of the support shaft (see JP 2011-230559 A).

In the connector for a sun visor, a pair of connector terminals are accommodated in the housing, and a pair of arm connection portions are connected so as to be sandwiched between a pair of conduction portions provided at an end of the support shaft.

In addition, the sun visor body is rotated, such that the pair of arm connection portions and the pair of conduction portions of the support shaft switch between a contact state and a non-contact state, and turn-on and turn-off of an illumination apparatus provided in the sun visor body are switched.

Incidentally, in the connector for a sun visor as disclosed in JP 2011-230559 A, when the connector terminal is not arranged at a regular position of the housing in a state where the connector terminal is accommodated in the housing, a failure in contact between the mating connection portion or the arm connection portion and the mating terminal or an end of the arm portion occurs, which leads to a concern that the reliability of connection may deteriorate.

SUMMARY

The disclosure is directed to a connector for a sun visor which is capable of maintaining the reliability of connection.

According to a first aspect, there is provided a connector for a sun visor including a bracket configured to be attached to an attachment member, an arm portion which rotatably supports a sun visor body arranged on one side of the attachment member and of which an end is rotatably arranged and inserted into the bracket, a housing fixed to the other side of the attachment member of the bracket and arranged in a vicinity of the end of the arm portion inserted into the bracket, a connector terminal accommodated in the housing and including a mating connection portion connected to a mating terminal arranged on the other side of the attachment member and an arm connection portion connected to the end of the arm portion, a fixing portion provided in the connector terminal, inserted and engaged into a portion of the housing which faces the bracket, and fixing the connector terminal to the housing, and a pressing portion provided at a portion of the connector terminal which faces the bracket, abutting on the bracket, and pressing the connector terminal in an insertion direction of the fixing portion.

In the connector for a sun visor, the pressing portion abutting on the bracket and pressing the connector terminal in an insertion direction of the fixing portion is provided at a portion of the connector terminal which faces the bracket, and thus the fixing portion can be inserted to a regular position by the pressing portion abutting on the bracket even when the connector terminal is accommodated in the housing in a half-inserted state of the fixing portion.

Therefore, in such a connector for a sun visor, it is possible to hold the connector terminal at a regular position of the housing by the pressing portion and to maintain the reliability of connection by preventing a failure in contact between the mating connection portion and the arm connection portion.

A second aspect is the connector for a sun visor according to the first aspect, the pressing portion may include a flat plate portion abutting on the bracket on a plane.

In the connector for a sun visor, the pressing portion includes the flat plate portion abutting on the bracket on a plane, and thus it is possible to increase an abutting area between the pressing portion and the bracket and to stably hold the connector terminal at a regular position of the housing.

A third aspect is the connector for a sun visor according to the second aspect, the flat plate portion may be arranged so as to be inclined toward the bracket in a state before the flat plate portion abuts on the bracket.

In the connector for a sun visor, the flat plate portion is arranged so as to be inclined toward the bracket in a state before the flat plate portion abuts on the bracket, it is possible to reliably make the flat plate portion abut on the bracket at the time of installing the housing accommodating the connector terminal to the bracket and to stably guide the connector terminal to a regular position of the housing.

A fourth aspect is the connector for a sun visor according to the second aspect or the third aspect, the mating connection portion may be formed in a box shape, and the flat plate portion may be arranged facing the mating connection portion and is arranged so as to block an opening of the mating connection portion in a state where the connector terminal is held in the housing.

In the connector for a sun visor, the flat plate portion is arranged facing the box-shaped mating connection portion and is arranged so as to block the opening of the mating connection portion in a state where the connector terminal is held in the housing, and thus it is possible to protect the mating connection portion by using the flat plate portion.

According to the above-described configuration, an effect is exhibited which is capable of providing a connector for a sun visor capable of maintaining the reliability of connection.

DETAILED DESCRIPTION

Figure 1:
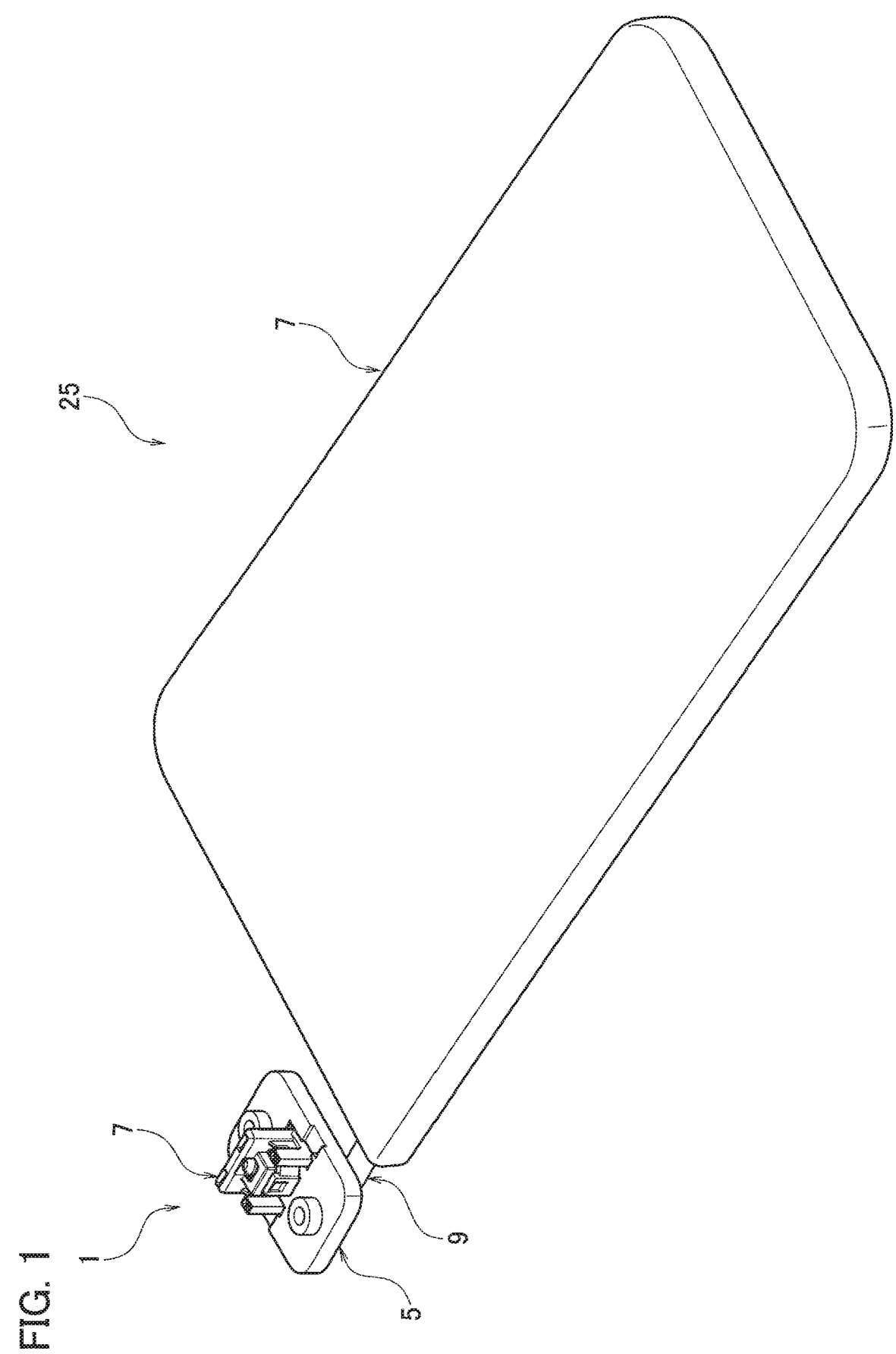
FIG. 1 is a perspective view of a sun visor to which a connector for a sun visor according to an embodiment is applied.
Figure 2:
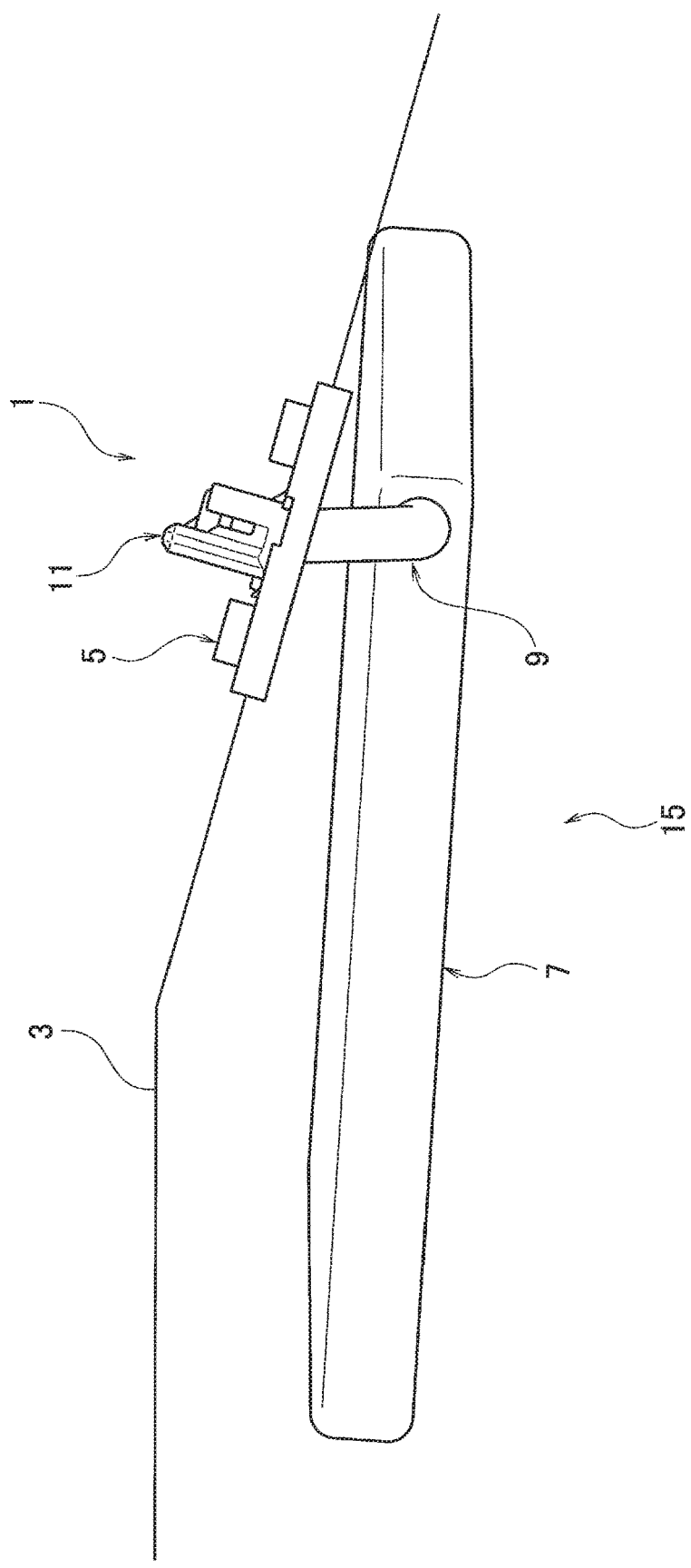
FIG. 2 is a side view when the sun visor to which the connector for a sun visor according to the embodiment is applied is attached to an attachment member.
Figure 3:
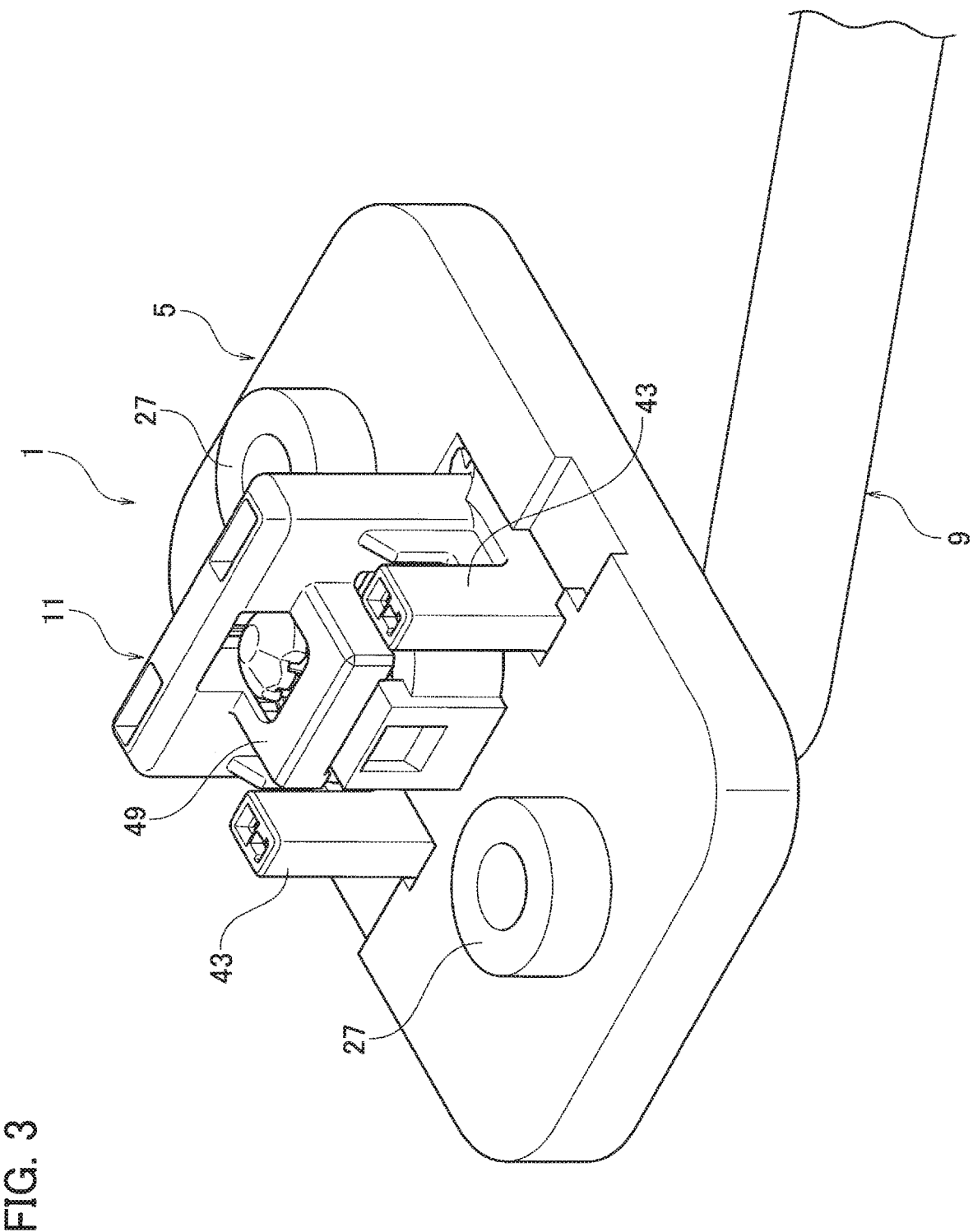
FIG. 3 is a perspective view of a connector for a sun visor according to a first embodiment.
Figure 4:
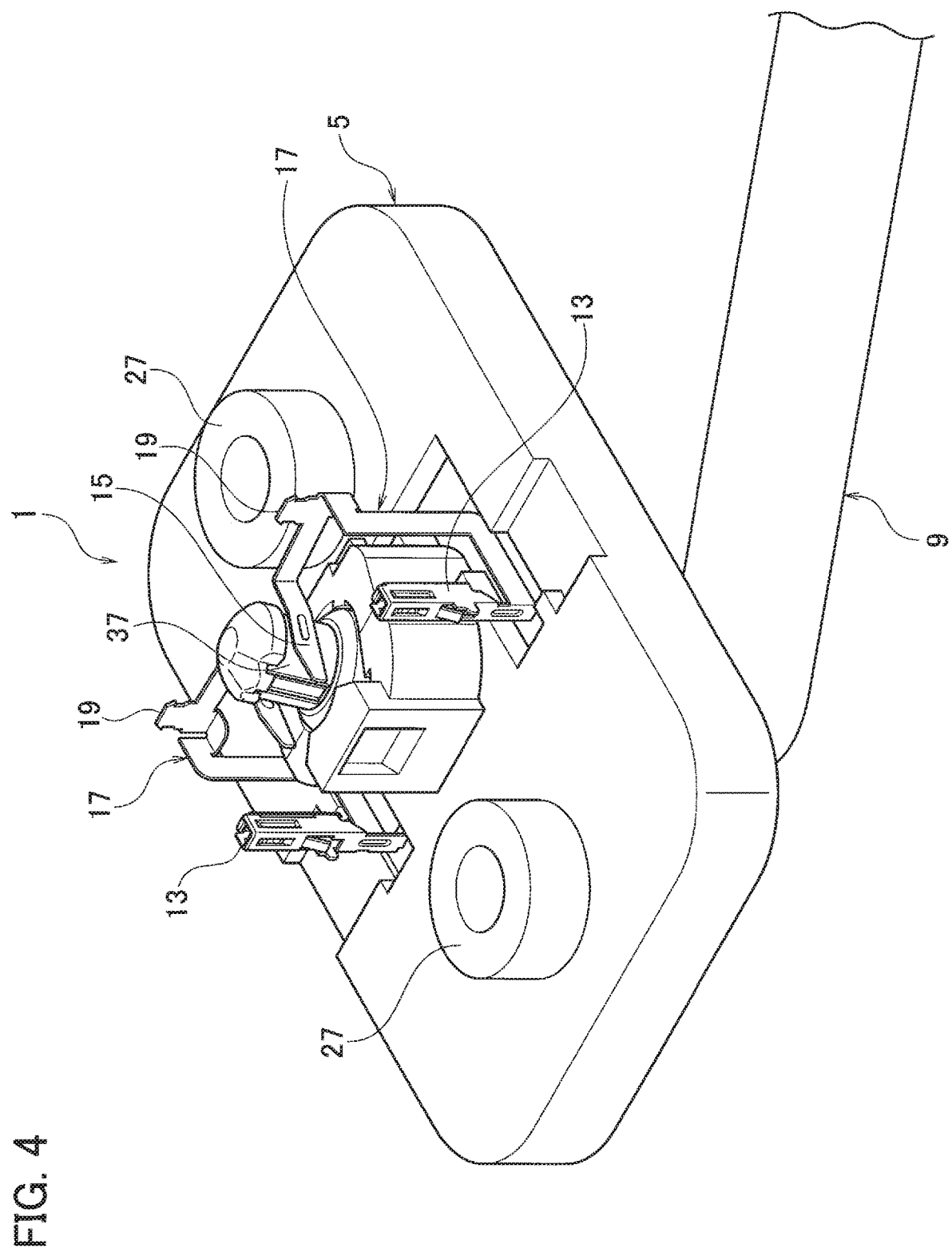
FIG. 4 is a perspective view when a housing of the connector for a sun visor according to the first embodiment is removed.
Figure 5:
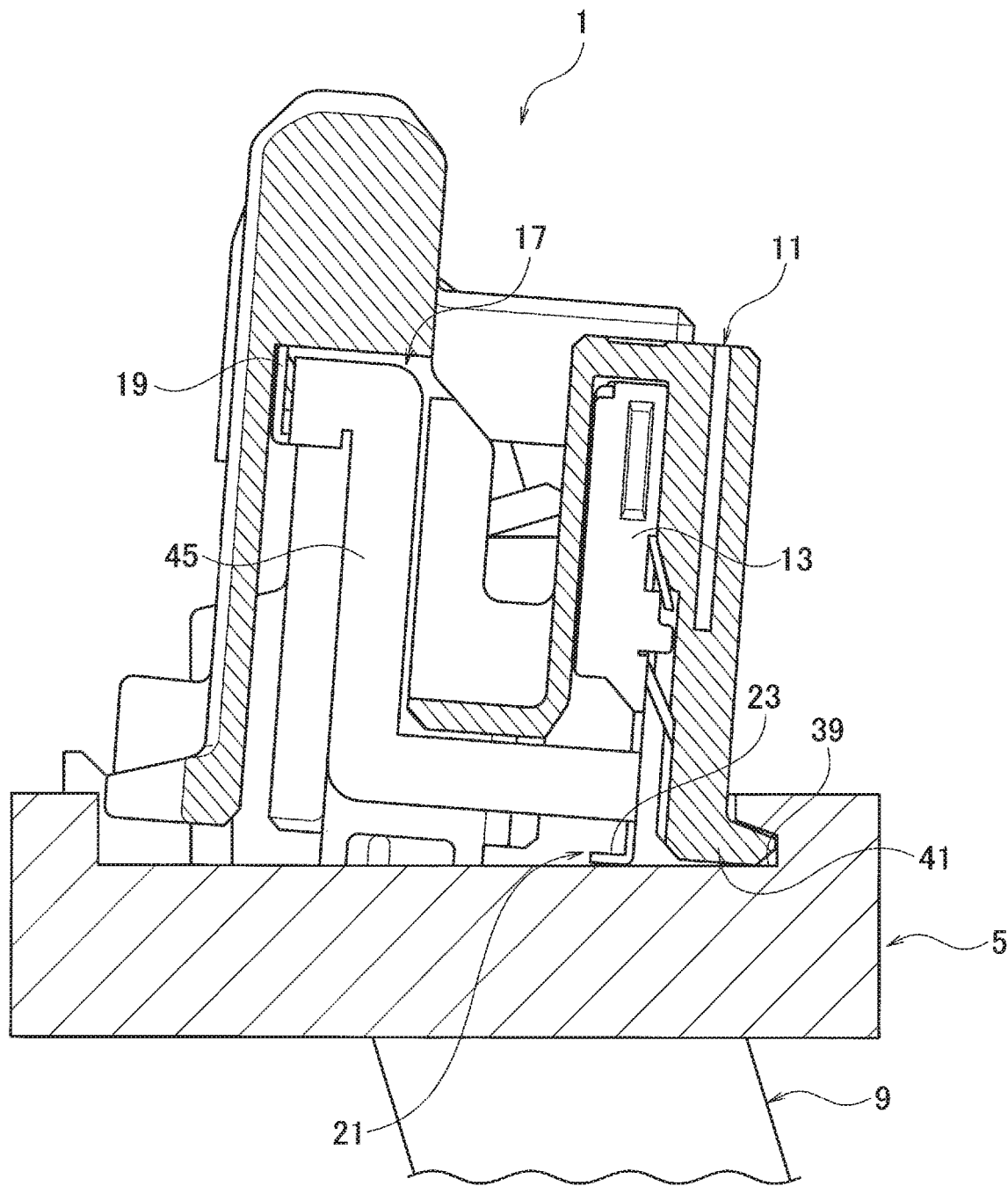
FIG. 5 is a cross-sectional view when the housing of the connector for a sun visor according to the first embodiment is installed to a bracket.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

First Embodiment

A first embodiment will be described using FIGS. 1 to 10.

A connector 1 for a sun visor according to the present embodiment includes a bracket 5 which is attached to an attachment member 3, an arm portion 9 which rotatably supports a sun visor body 7 arranged on one side (hereinafter, referred to as a "vehicle interior side") of the attachment member 3 and of which an end is rotatably arranged so as to be inserted into the bracket 5, a housing 11 which is fixed to the other side (hereinafter, referred to as a "vehicle exterior side") of the attachment member 3 of the bracket 5 and is arranged in the vicinity of the end of the arm portion 9 which is inserted into the bracket 5, and a connector terminal 17 which is accommodated in the housing 11 and includes a mating connection portion 13 connected to a mating terminal arranged on the vehicle exterior side of the attachment member 3 and an arm connection portion 15 connected to the end of the arm portion 9.

In addition, the connector terminal 17 is provided with a fixing portion 19 inserted and engaged into a portion of the housing 11 which faces the bracket 5 and fixing the connector terminal 17 to the housing 11.

In addition, a pressing portion 21 abutting on the bracket 5 and pressing the connector terminal 17 in an insertion direction of the fixing portion 19 is provided at a portion of the connector terminal 17 which faces the bracket 5.

In addition, the pressing portion 21 includes a flat plate portion 23 which abuts on the bracket 5 on a plane.

As illustrated in FIGS. 1 to 10, the connector 1 for a sun visor is applied to a sun visor 25 attached to the ceiling of the vehicle interior as the attachment member 3.

The sun visor 25 includes a sun visor body 7 and the connector 1 for a sun visor.

The sun visor body 7 is formed to have a rectangular shape, is arranged on the vehicle interior side of the ceiling (attachment member 3), and is configured so that a mirror (not illustrated) and a lamp (not illustrated) that irradiates the mirror are arranged on the surface thereof and an illumination apparatus (not illustrated) that turns on or turns off the lamp is accommodated therein.

In the sun visor body 7, the arm portion 9 which is inserted into a long side portion and exposed toward the ceiling (attachment member 3) side from an end thereof is arranged, and an illumination apparatus is electrically connected to a power source (not illustrated) for power supply arranged on the vehicle exterior side of the ceiling (attachment member 3) through the connector 1 for a sun visor.

The connector 1 for a sun visor includes the bracket 5, the arm portion 9, the housing 11, and the connector terminal 17.

The bracket 5 is formed to have a rectangular plate shape and is fixed to the attachment member 3 through a fixing unit such as a bolt by using attachment portions 27 and 27 respectively provided on both sides in the longitudinal direction thereof.

A supporting portion 29 into which an end of the arm portion 9 is inserted and which is formed to have a tubular shape rotatably supporting the arm portion 9 is provided at the central portion of the bracket 5.

The arm portion 9 is configured so that two conductors (not illustrated) electrically connected to the illumination apparatus accommodated in the sun visor body 7 are insert-molded therein and includes a long shaft portion 31 and a short shaft portion 33.

The long shaft portion 31 is inserted into the inside in the vicinity of the long side of the sun visor body 7 and rotatably supports the sun visor body 7 between a storage position (a position where a closed state is set with respect to the attachment member 3) and a light shield position (a position where a closed state is set with respect to a windshield and a side glass) around the axial center of the long shaft portion 31.

A pair of contact portions (not illustrated) at which the two conductors insert-molded inside the arm portion 9 are arranged so as to be exposed are provided at an end of the long shaft portion 31 which is positioned inside the sun visor body 7, and a pair of terminals (not illustrated) provided in the illumination apparatus are in contact with the pair of contact portions.

For example, the pair of contact portions and the pair of terminals are not in contact with each other at the storage position of the sun visor body 7 to turn off the lamp and are in contact with each other at the light shield position of the sun visor body 7 to turn on the lamp.

The short shaft portion 33 is provided at an end of the long shaft portion 31 as one continuous member, the end being exposed to the outside of the sun visor body 7.

The short shaft portion 33 extends from the end of the long shaft portion 31 which is exposed from the sun visor body 7 toward the attachment member 3 so that the arm portion 9 is formed to have an L shape.

A rotating portion 35 rotating around the axial center of the short shaft portion 33 is provided on the attachment member 3 side, and the arm portion 9 is supported by the bracket 5 so as to be rotatable around the axial center of the short shaft portion 33 by inserting the rotating portion 35 into the supporting portion 29 of the bracket 5 and pressing in and fixing the rotating portion 35.

The short shaft portion 33 is supported by the bracket 5 in this manner, and thus the sun visor body 7 is rotatable between a front position (a position where the sun visor body is moved to the windshield side) and a side position (a position where the sun visor body is moved to the side glass side) around the axial center of the short shaft portion 33.

A pair of contact portions 37 and 37 at which two conductors insert-molded inside the arm portion 9 are arranged so as to be exposed are provided at an end of the short shaft portion 33, the end being inserted into the bracket 5.

The housing 11 is arranged so as to cover the pair of contact portions 37 and 37 at the bracket 5 at which the pair of contact portions 37 and 37 are arranged.

The housing 11 is formed of an insulating material such as synthetic resins, is arranged so as to cover the supporting portion 29 of the bracket 5, and is fixed to the bracket 5 by engaging engagement portions 41 and 41 with to-be-engaged portions 39 and 39 provided on both sides of the supporting portion 29.

The housing 11 is provided with a pair of fitting portions 43 and 43 which are arranged on the vehicle exterior side which is a side opposite to the sun visor body 7 of the ceiling (attachment member 3) and to which a mating housing (not illustrated) connected to a power source for power supply is fitted.

A pair of connector terminals 17 and 17 are accommodated in the housing 11, and the mating housing is fitted to the pair of fitting portions 43 and 43, such that it is possible to supply power to the illumination apparatus accommodated in the sun visor body 7 through the arm portion 9.

Each of the pair of connector terminals 17 and 17 includes a body portion 45, the mating connection portion 13, the arm connection portion 15, the fixing portion 19, and the pressing portion 21.

Meanwhile, since the pair of connector terminals 17 and 17 are formed to be laterally symmetrical to each other, one connector terminal 17 will be described below and the other connector terminal 17 will not be described.

The body portion 45 is formed of a conductive material, is formed to have a flat plate shape, and is subjected to bending processing so that the mating connection portion 13 is provided on one end side thereof and the arm connection portion 15 is provided on the other end side.

The mating connection portion 13 is formed to have a box shape in which an elastically deformable elastic piece having a contact point therein is arranged by performing bending processing on one end side of the body portion 45. The mating connection portion 13 is arranged inside the fitting portion 43 in a state where the mating connection portion is accommodated in the housing 11 and comes into contact with a mating terminal (not illustrated) accommodated in the mating housing by the mating housing being fitted to the fitting portion 43, whereby the connector terminal 17 and the mating terminal are electrically connected to each other.

The arm connection portion 15 is provided so as to be elastically deformable through a bent portion 47 by performing bending processing on the other end side of the body portion 45 and is provided with a contact point 15a protruding toward the contact portion 37 of the arm portion 9.

The arm connection portion 15 is arranged facing the arm connection portion 15 of the other connector terminal 17 with the pair of contact portions 37 and 37 (an end of the short shaft portion 33) interposed therebetween inside a protection portion 49 exposed toward the pair of contact portions 37 and 37 of the arm portion 9 of the housing 11 in a state where the arm connection portion is accommodated in the housing 11.

Such an arm connection portion 15 comes into contact with the arm connection portion 15 of the other connector terminal 17 so as to sandwich the pair of contact portions 37 and 37 using a biasing force, and the connector terminal 17 and the arm portion 9 are electrically connected to each other.

Here, the arm portion 9 is configured to be rotatable around the axial center of the short shaft portion 33 with respect to the bracket 5, and thus the sun visor body 7 is rotatable between the front position and the side position. A pair of the pair of arm connection portions 15 and 15 and the pair of contact portions 37 and 37 come into contact with each other, for example, at the front position of the sun visor body 7 to turn on the lamp and do not come into contact with each other at the side position of the sun visor body 7 to turn off the lamp with respect to the movement of the sun visor body 7.

The body portion 45 positioned between the arm connection portion 15 and the mating connection portion 13 is provided with the fixing portion 19 for fixing the connector terminal 17 to the housing 11.

The fixing portion 19 protrudes toward an inner wall surface of the housing 11 from a side surface positioned between the mating connection portion 13 and the arm connection portion 15 of the body portion 45.

The fixing portion 19 is provided with press-in portions 51 and 51 respectively protruding outward so as to have an inclined shape on both sides in the width direction thereof.

The press-in portions 51 and 51 are pressed in a to-be-pressed-in portion provided at a portion of the housing 11 which faces the bracket 5 with the connector terminal 17 interposed therebetween in a state where the housing 11 is installed to the bracket 5, whereby the connector terminal 17 is fixed to the housing 11.

Such a fixing portion 19 is inserted into the to-be-pressed-in portion of the housing 11 to engage therewith, that is, to be pressed therein in a state before the housing 11 is installed to the bracket 5, such that the connector terminal 17 is fixed to the housing 11 in advance.

Meanwhile, the body portion 45 positioned between the fixing portion 19 and the mating connection portion 13 is provided with a bent portion 53 which is bent in a planar direction perpendicular to a direction in which the mating terminal and the mating connection portion 13 are fitted to each other and a planar direction parallel to the direction in which the mating terminal and the mating connection portion 13 are fitted to each other.

The bent portion 53 attenuates vibration generated on the mating connection portion 13 side such as free movement occurring between the mating connection portion 13 and the mating terminal, and prevents a failure in contact from occurring on the arm connection portion 15 side.

Additionally, the bent portion 53 is provided, such that it is possible to arrange the mating connection portion 13 and the arm connection portion 15 in proximity to each other and to miniaturize the housing 11 accommodating the connector terminal 17.

When the fixing portion 19 positioned in the vicinity of the bent portion 53 is not sufficiently inserted into the to-be-pressed-in portion of the housing 11 (a half-inserted state or the like), the connector terminal 17 is not accommodated in the housing 11 at a regular position, which leads to a concern that the mating connection portion 13 or the arm connection portion 15 may be arranged at the fitting portion 43 or the protection portion 49 so as to deviate.

When the mating connection portion 13 or the arm connection portion 15 is arranged at the fitting portion 43 or the protection portion 49 so as to deviate in this manner, contact between the mating terminal and the pair of contact portions 37 and 37 becomes unstable, which leads to a concern that a failure in contact may occur in the mating connection portion 13 and the arm connection portion 15.

Consequently, the connector terminal 17 is provided with the pressing portion 21 abutting on the bracket 5 and pressing the connector terminal 17 in an insertion direction of the fixing portion 19.

The pressing portion 21 is provided at a portion in which the mating connection portion 13 of the body portion 45 is positioned and which faces the bracket 5, and includes the flat plate portion 23 abutting on the bracket 5 on a plane.

The flat plate portion 23 is provided so that a portion extending from the body portion 45 to the bracket 5 is bent at 90 degrees so as to become parallel to the surface of the bracket 5.

The flat plate portion 23 abuts on the surface of the bracket 5 on a plane by installing the housing 11 to the bracket 5 in a state where the connector terminal 17 is accommodated in the housing 11, that is, in a state where the fixing portion 19 is inserted into the to-be-pressed-in portion of the housing 11 to engage therewith.

In this case, when the fixing portion 19 is not sufficiently inserted into the to-be-pressed-in portion of the housing 11 (half-insertion or the like), the connector terminal 17 is pressed in a direction in which the fixing portion 19 is inserted by the pressing portion 21 (flat plate portion 23) and the bracket 5 abutting on each other, and the fixing portion 19 is pushed into the to-be-pressed-in portion of the housing 11 until the fixing portion 19 is sufficiently inserted.

For this reason, even when the fixing portion 19 is not sufficiently inserted, the fixing portion 19 can be arranged at a normal insertion position by the pressing portion 21, and the connector terminal 17 can be accommodated at a regular position of the housing 11.

Therefore, the mating connection portion 13 or the arm connection portion 15 is not arranged at the fitting portion 43 or the protection portion 49 so as to deviate, and thus it is possible to stabilize contact between the mating terminal and the pair of contact portions 37 and 37 and to prevent a failure in contact from occurring in the mating connection portion 13 and the arm connection portion 15.

Meanwhile, a pressing force applied to the connector terminal 17 by the pressing portion 21 when the fixing portion 19 is arranged at a normal insertion position is set to a pressing force to such a degree that the body portion 45 is not deformed, such that the connector terminal 17 can be stably held at a regular position of the housing 11.

Here, in a case where the pressing portion 21 does not include the flat plate portion 23, an abutting area between the pressing portion 21 and the bracket 5 is a plate thickness of the body portion 45, and thus there is a concern that the pressing portion 21 may bite into the bracket 5 when the pressing portion 21 and the bracket 5 abut on each other.

When the pressing portion 21 bites into the bracket 5, the fixing portion 19 cannot be pressed at a normal insertion position, which leads to a concern that the connector terminal 17 cannot be arranged at a regular position of the housing 11.

On the other hand, since the pressing portion 21 includes the flat plate portion 23 abutting on the bracket 5 on a plane, it is possible to increase an abutting area between the pressing portion 21 and the bracket 5 and to arrange the connector terminal 17 at a regular position of the housing 11 by preventing the pressing portion 21 from biting into the bracket 5.

Additionally, the pressing portion 21 includes the flat plate portion 23, such that the pressing portion 21 does not bite into an operator's hand by pressing the flat plate portion 23 in a case where the operator manually accommodates the connector terminal 17 in the housing 11, and thus it is possible to improve installation workability.

In such a connector 1 for a sun visor, the pressing portion 21 abutting on the bracket 5 and pressing the connector terminal 17 in an insertion direction of the fixing portion 19 is provided at a portion of the connector terminal 17 which faces the bracket 5, and thus the fixing portion 19 can be inserted to a regular position by the pressing portion 21 abutting on the bracket 5 even when the connector terminal 17 is accommodated in the housing 11 in a half-inserted state of the fixing portion 19.

Therefore, in such a connector 1 for a sun visor, it is possible to hold the connector terminal 17 at a regular position of the housing 11 by the pressing portion 21 and to maintain the reliability of connection by preventing a failure in contact with the mating connection portion 13 and the arm connection portion 15.

In addition, the pressing portion 21 includes the flat plate portion 23 abutting on the bracket 5 on a plane, and thus it is possible to increase an abutting area between the pressing portion 21 and the bracket 5 and to stably hold the connector terminal 17 at a regular position of the housing 11.

Second Embodiment

A second embodiment will be described using FIGS. 11 and 12.

In a connector 101 for a sun visor according to the present embodiment, a flat plate portion 103 is arranged so as to be inclined toward a bracket 5 in a state before the flat plate portion abuts on the bracket 5.

In addition, the flat plate portion 103 is arranged facing a mating connection portion 13 and is arranged so as to block an opening of the mating connection portion 13 in a state where a connector terminal 17 is held in a housing 11.

Meanwhile, the same components as those in the first embodiment are denoted by the same reference numerals, and description of the components and the functions thereof will be omitted by referring to the first embodiment. However, since the components are the same, actions and effects to be obtained are the same.

Figure 6:
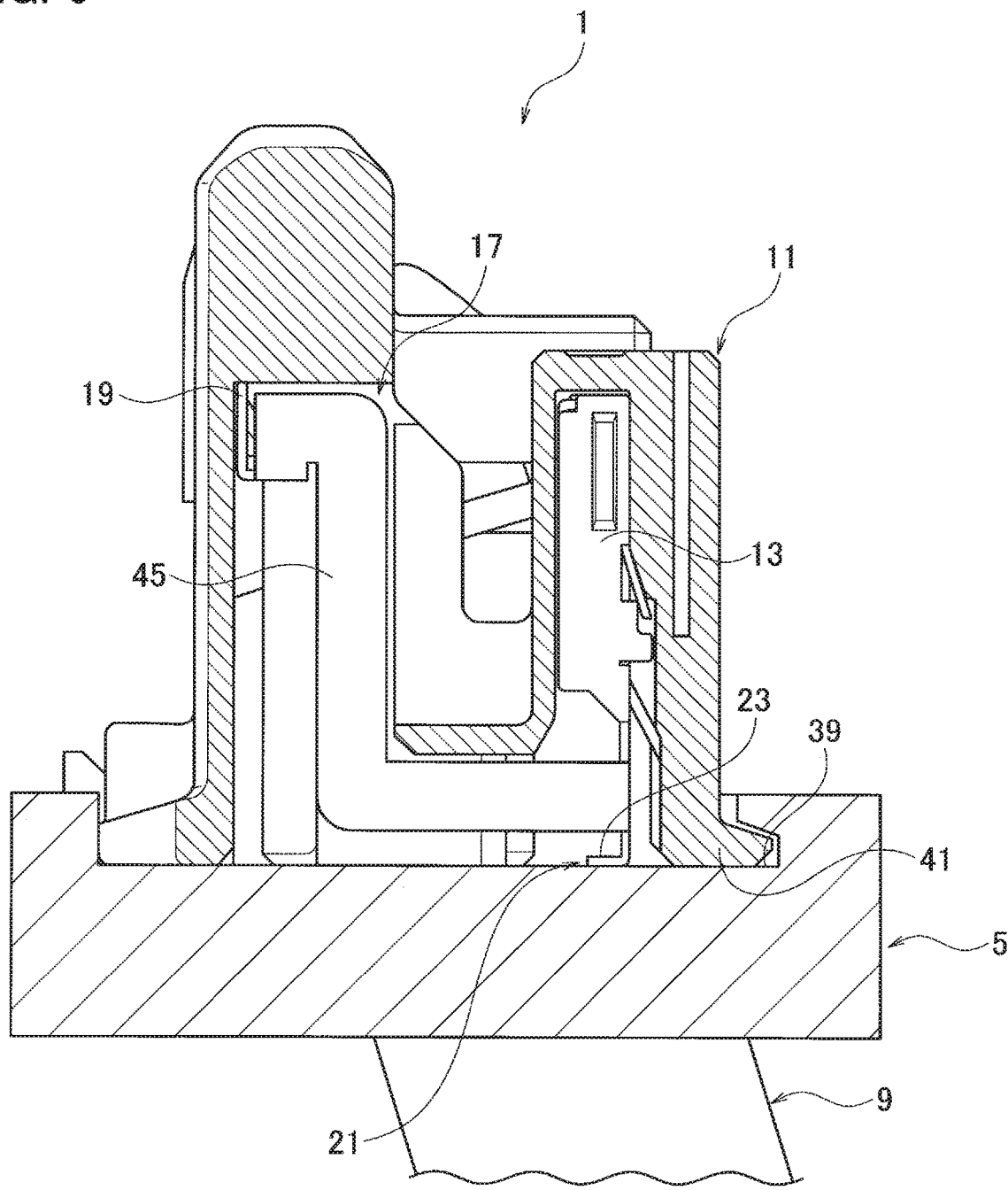
FIG. 6 is a cross-sectional view of the connector for a sun visor according to the first embodiment.
Figure 7:
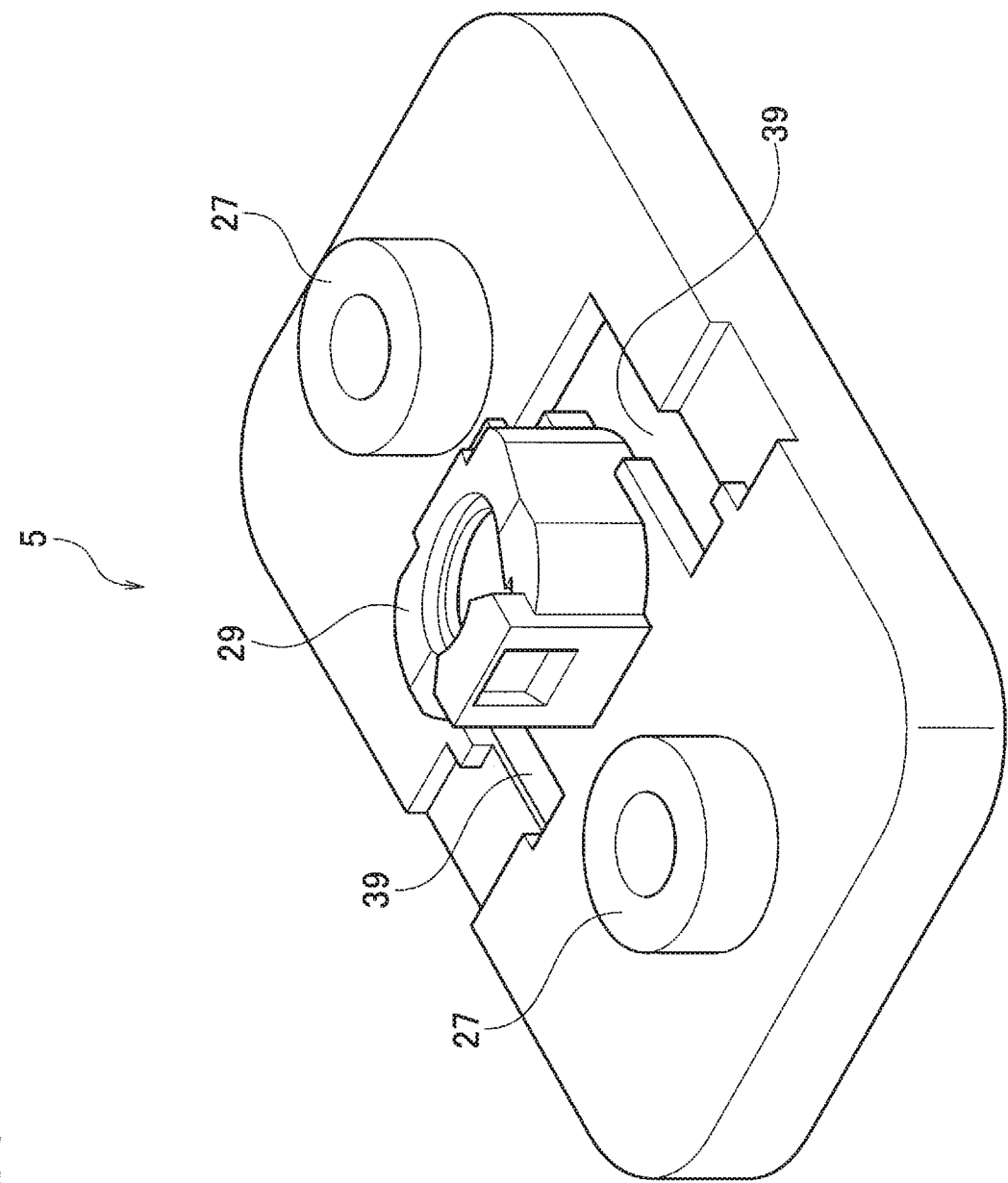
FIG. 7 is a perspective view of a bracket of the connector for a sun visor according to the first embodiment.
Figure 8:
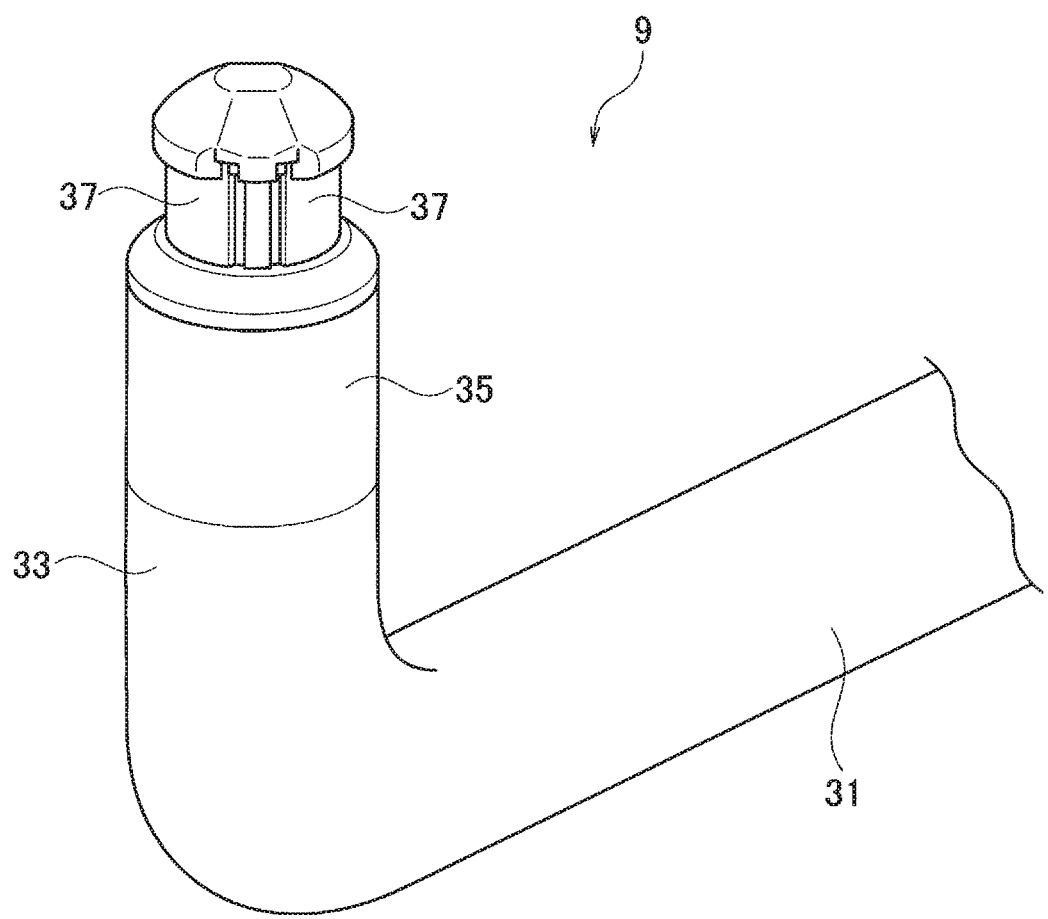
FIG. 8 is a perspective view of an arm portion of the connector for a sun visor according to the first embodiment.
Figure 9:
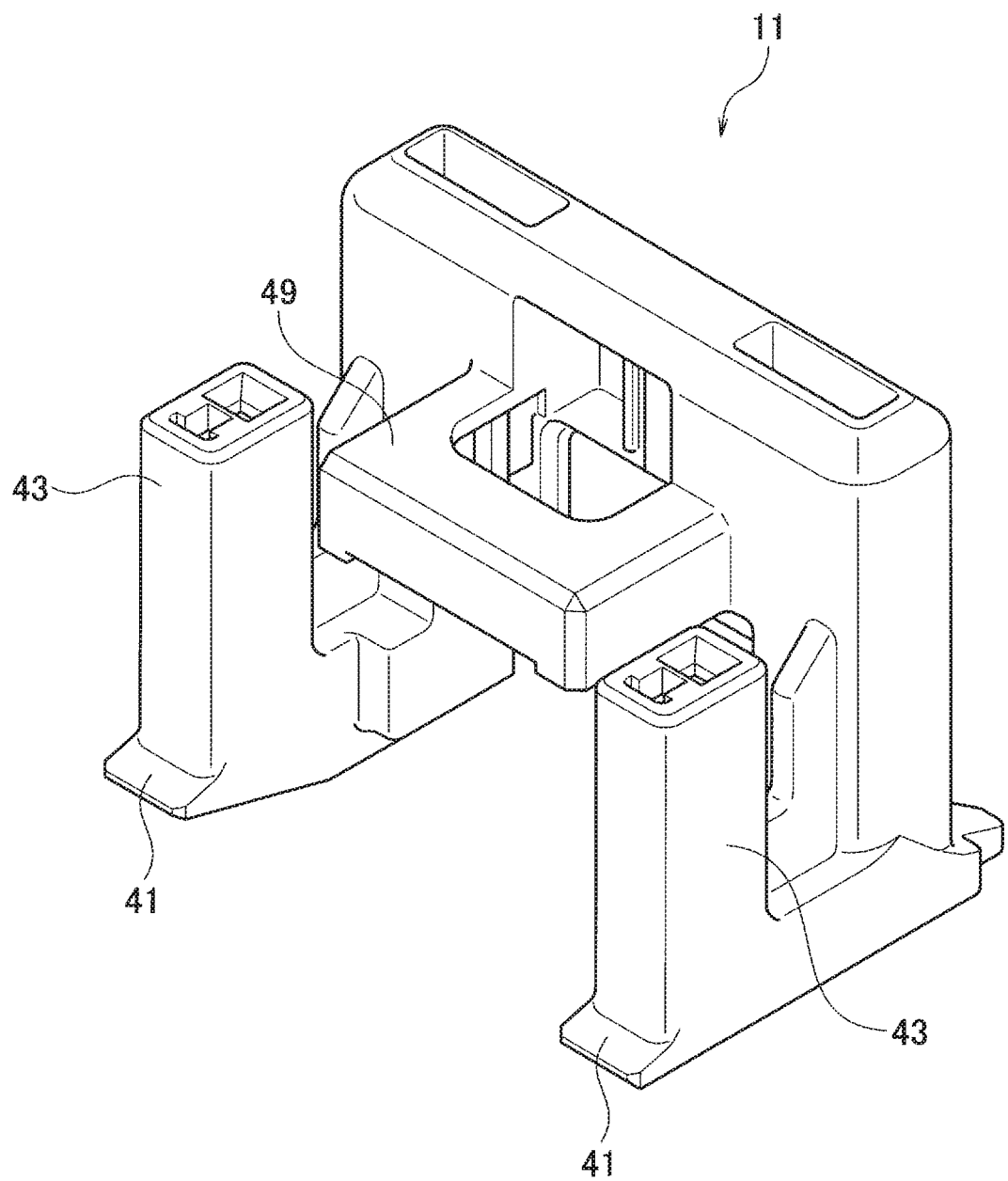
FIG. 9 is a perspective view of a housing of the connector for a sun visor according to the first embodiment.
Figure 10:
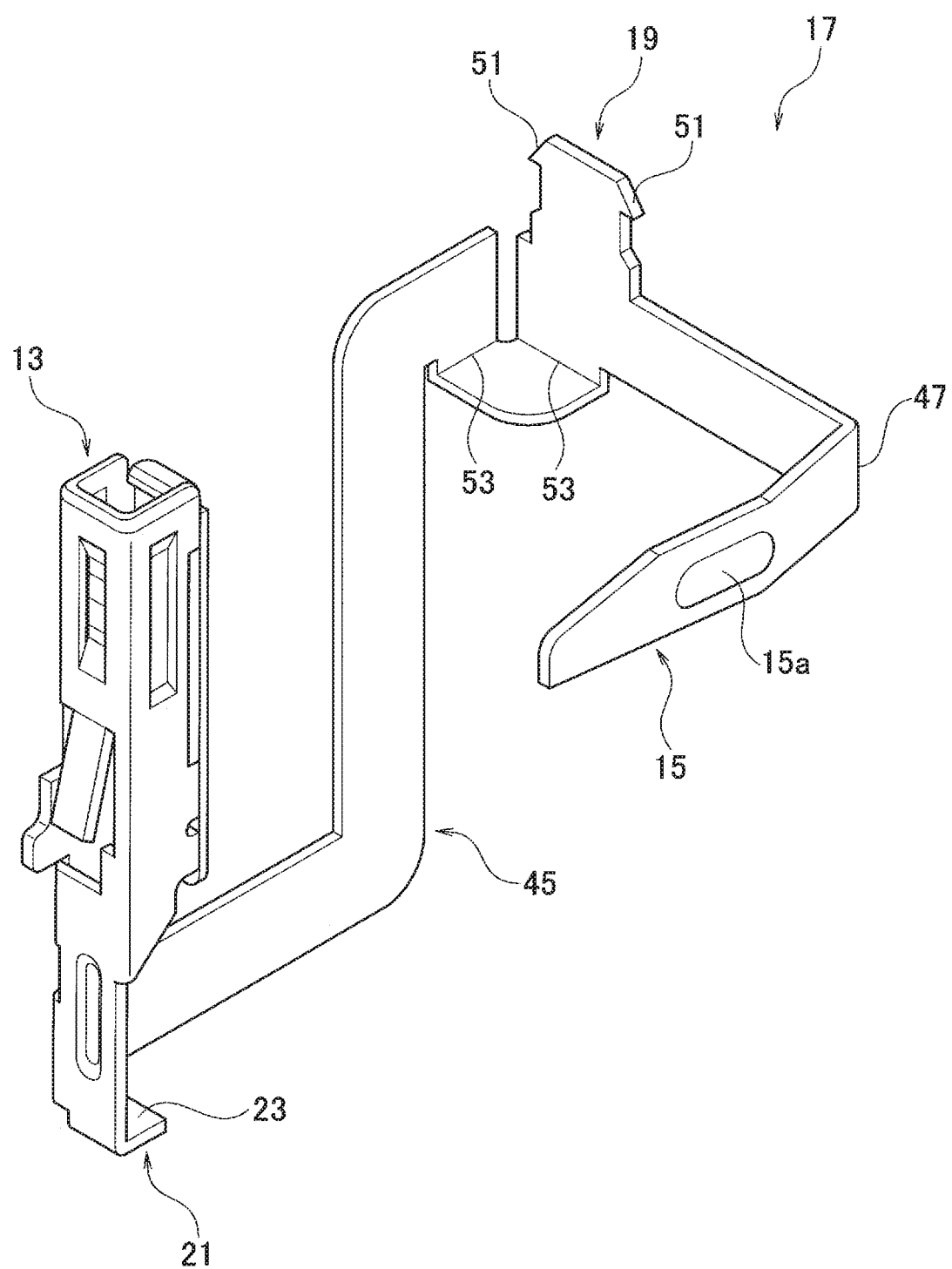
FIG. 10 is a perspective view of a connector terminal of the connector for a sun visor according to the first embodiment.
Figure 11:
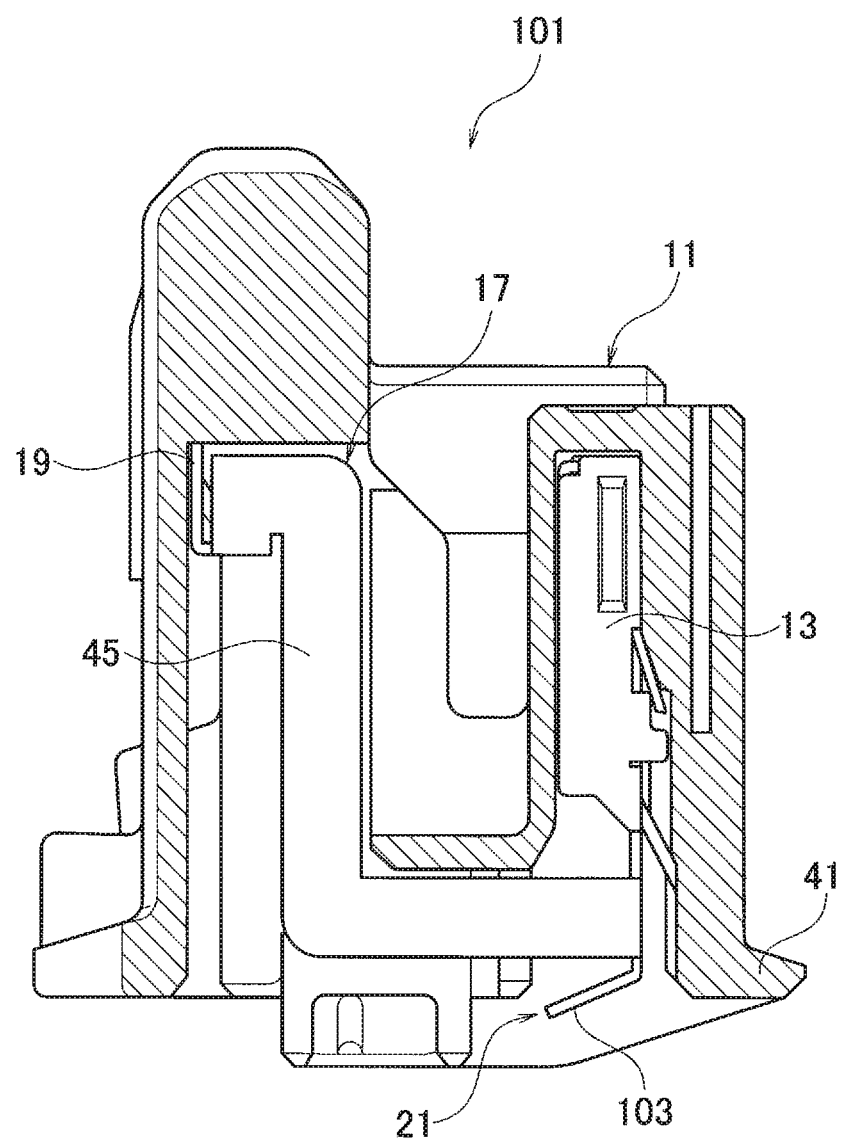
FIG. 11 is a cross-sectional view when a connector terminal is installed to a housing of a connector for a sun visor according to a second embodiment.
Figure 12:
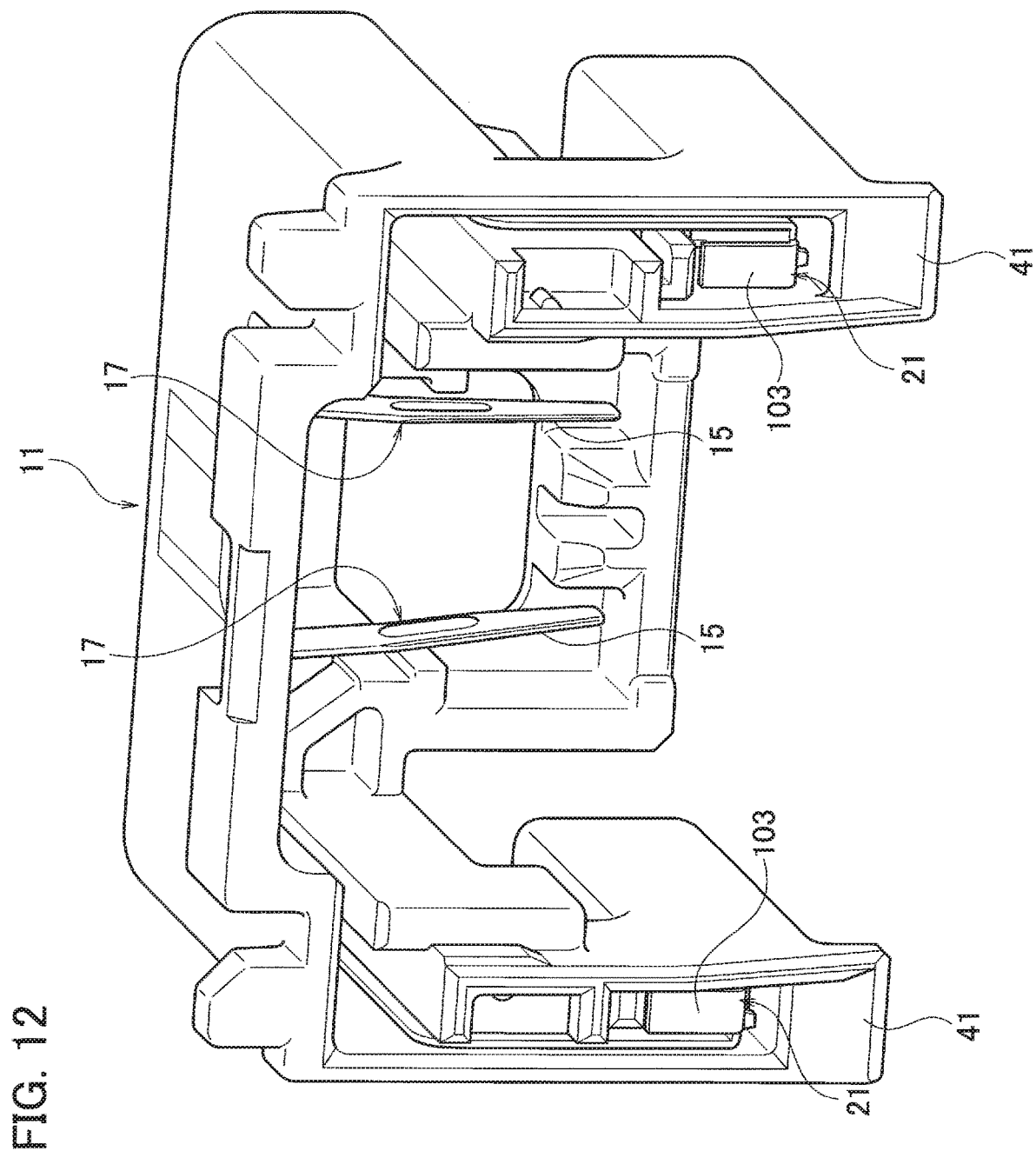
FIG. 12 is a perspective view when the connector terminal is installed to the housing of the connector for a sun visor according to the second embodiment.

As illustrated in FIGS. 11 and 12, the flat plate portion 103 of a pressing portion 21 is provided so that a portion extending from a body portion 45 to the bracket 5 is bent at 90 degrees or smaller so as to be inclined toward the bracket 5 in a state before the flat plate portion abuts on the bracket 5 (see FIG. 6).

Since the flat plate portion 103 is inclined toward the bracket 5, an end of the flat plate portion necessarily abuts on the bracket 5 at the time of installing the housing 11 to the bracket 5 in a state where the connector terminal 17 is accommodated in the housing 11 even when the fixing portion 19 is or is not arranged at a regular insertion position.

In this case, when the fixing portion 19 is not arranged at the regular insertion position, the flat plate portion 103 is deformed so as to become parallel to the surface of the bracket 5 at an early stage of the installation of the housing 11 to the bracket 5, the plane of the flat plate portion 103 abuts on the surface of the bracket 5, and the fixing portion 19 is moved to the regular insertion position.

On the other hand, in a case where the fixing portion 19 is arranged at the regular insertion position, the flat plate portion 103 is deformed so as to become parallel to the surface of the bracket 5 at a final stage of the installation of the housing 11 to the bracket 5, the plane of the flat plate portion 103 abuts on the surface of the bracket 5, and the fixing portion 19 is held at the regular insertion position.

The flat plate portion 103 of the pressing portion 21 is arranged so as to be inclined toward the bracket 5 in this manner, such that it is possible to reliably make the flat plate portion 103 abut on the bracket 5 when the housing 11 accommodating the connector terminal 17 is installed to the bracket 5.

Additionally, since it is possible to reliably make the flat plate portion 103 and the bracket 5 abut on each other, it is possible to reliably press the connector terminal 17 in an insertion direction of the fixing portion 19 by the pressing portion 21 by absorbing manufacturing tolerance of members and installation looseness.

Such a flat plate portion 103 is arranged so as to block an opening of the box-shaped mating connection portion 13 (an opening on a side opposite to an opening fitted to a mating terminal) which is arranged facing the flat plate portion in a state where the connector terminal 17 is held (accommodated) in the housing 11.

In detail, the length (area) of the flat plate portion 103 extending from the body portion 45 is set so that the flat plate portion 103 blocks the opening of the mating connection portion 13 (the opening is not seen) when the housing 11 is seen from below (the bracket 5 side) in a state where the connector terminal 17 is held in the housing 11.

The flat plate portion 103 is arranged in this manner, such that it is possible to prevent the mixing of foreign substances in the box-shaped mating connection portion 13, and the like and to protect an elastically deformable elastic piece arranged inside the box-shaped mating connection portion 13.

In such a connector 101 for a sun visor, the flat plate portion 103 is arranged so as to be inclined toward the bracket 5 in a state before the flat plate portion 103 abuts on the bracket 5, it is possible to reliably make the flat plate portion 103 abut on the bracket 5 at the time of installing the housing 11 accommodating the connector terminal 17 to the bracket 5 and to stably guide the connector terminal 17 to a regular position of the housing 11.

In addition, since the flat plate portion 103 is arranged facing the box-shaped mating connection portion 13 and is arranged so as to block the opening of the mating connection portion 13 in a state where the connector terminal 17 is held in the housing 11, the mating connection portion 13 can be protected by the flat plate portion 103.

Meanwhile, in the connector for a sun visor according to the present embodiment, an engagement structure of a fixing portion is obtained by being pressed in a housing. However, the invention is not limited thereto, and the engagement of the fixing portion may be engagement between an engagement protrusion and an engagement hole, or the like. The engagement of the fixing portion may be any engagement as long as an insertion direction of the fixing portion and a pressing direction of a pressing portion are the same as each other.

Further, in the connector for a sun visor according to the first embodiment, a flat plate portion does not have such an extension length so as to block an opening of a box-shaped mating connection portion, but the extension length of the flat plate portion may be set so as to block the opening of the box-shaped mating connection portion.

Further, one fixing portion and one pressing portion are provided in a connector terminal. However, the invention is not limited thereto, and a plurality of fixing portions and a plurality of pressing portions may be provided in the connector terminal.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes, which come within the meaning and range of equivalency of the claims, are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A connector for a sun visor comprising:
   a bracket configured to be attached to an attachment member;
   an arm portion which rotatably supports a sun visor body arranged on one side of the attachment member, and of which an end is rotatably arranged and inserted into the bracket;
   a housing fixed to an other side of the attachment member of the bracket and arranged in a vicinity of the end of the arm portion inserted into the bracket;
   a connector terminal accommodated in the housing and including a mating connection portion connected to a mating terminal arranged on the other side of the attachment member and an arm connection portion connected to the end of the arm portion;
   a fixing portion provided in the connector terminal, inserted and engaged into a portion of the housing which faces the bracket, and fixing the connector terminal to the housing; and
   a pressing portion provided at a portion of the connector terminal which faces the bracket, abutting on the bracket, and pressing the connector terminal in an insertion direction of the fixing portion.

2. The connector for a sun visor according to claim 1, wherein the pressing portion includes a flat plate portion abutting on the bracket on a plane.

3. The connector for a sun visor according to claim 2, wherein the flat plate portion is arranged so as to be inclined toward the bracket in a state before the flat plate portion abuts on the bracket.

4. The connector for a sun visor according to claim 2, wherein
the mating connection portion is formed to have a box shape, and
the flat plate portion is arranged facing the mating connection portion and is arranged so as to block an opening of the mating connection portion in a state where the connector terminal is held in the housing.

\* \* \* \* \*